United States Patent [19]
Taylor, Sr.

[11] Patent Number: 5,862,797
[45] Date of Patent: Jan. 26, 1999

[54] OUTDOOR COOKING APPARATUS

[76] Inventor: Ray A. Taylor, Sr., 9541 County Rd. 344, Terrell, Tex. 75161

[21] Appl. No.: 7,307

[22] Filed: Jan. 15, 1998

[51] Int. Cl.[6] ........................................ F24C 1/16
[52] U.S. Cl. ........................... 126/9 R; 126/25 A; 126/30
[58] Field of Search ................................ 126/25 R, 25 A, 126/9 R, 29, 30, 9 B, 25 C, 50; 99/450, 449, 448; 248/278; 211/181.1, 153

[56] References Cited

U.S. PATENT DOCUMENTS

| | | | |
|---|---|---|---|
| 4,488,535 | 12/1984 | Johnson | 126/25 A |
| 5,065,734 | 11/1991 | Elliott | 126/9 R |

FOREIGN PATENT DOCUMENTS

| | | | |
|---|---|---|---|
| 2706274 | 12/1994 | France | 126/25 R |
| 7073 | 3/1898 | United Kingdom | 126/30 |

Primary Examiner—James C. Yeung

[57] ABSTRACT

An outdoor cooking apparatus including first angular framed member. The first angular framed member has a pair of front legs and a rear leg. The pair of front legs of the first angular framed member have a plurality of rungs fixedly attached and horizontally extending between the pair of front legs. Included is a second angular framed member that has a pair of front legs and rear leg. The rear leg is spaced an equal distance from the pair of front legs. The pair of front legs of the second angular framed member have a plurality of rungs fixedly attached thereto and horizontally extending between the pair of front legs. Finally, a pair of support poles are provided. Each support pole is positioned between the first angular frame and the second angular frame when the front legs of the first angular member face the front legs of the second angular member.

5 Claims, 2 Drawing Sheets

OUTDOOR COOKING APPARATUS

BACKGROUND OF THE INVENTION

1. Field of the Invention

The present invention relates to a outdoor cooking apparatus and more particularly pertains to providing a portable rack system for cooking over campfires.

2. Description of the Prior Art

The use of an outdoor grill is known in the prior art. More specifically, outdoor grills heretofore devised and utilized for the purpose of cooking are known to consist basically of familiar, expected and obvious structural configurations, notwithstanding the myriad of designs encompassed by the crowded prior art which have been developed for the fulfillment of countless objectives and requirements.

By way of example, the prior art includes U.S. Pat. No. 5,238,445 to Green discloses a campfire skewer. U.S. Pat. No. 4,688,543 to Kopke discloses a collapsible grill. U.S. Pat. No. 4,513,936 to Goulter discloses an adjustable support for cooking pots and the like. U.S. Pat. No. 4,230,089 to Barden discloses a support assembly for cooking utensils. U.S. Pat. No. 4,109,567 to Gage and Zacks discloses a camp grill. Lastly, U.S. Pat. No. Des. 259,536 to Douglas discloses a height adjustment means for selective spacing between circular cooking grill and hanging fire grate.

In this respect, the outdoor cooking apparatus according to the present invention substantially departs from the conventional concepts and designs of the prior art, and in so doing provides an apparatus primarily developed for the purpose of providing a portable rack system for cooking over campfires.

Therefore, it can be appreciated that there exists a continuing need for a new and improved outdoor cooking apparatus which can be used for providing a portable rack system for cooking over campfires. In this regard, the present invention substantially fulfills this need.

SUMMARY OF THE INVENTION

In view of the foregoing disadvantages inherent in the known types of outdoor grills now present in the prior art, the present invention provides an improved Outdoor cooking apparatus. As such, the general purpose of the present invention, which will be described subsequently in greater detail, is to provide a new and improved outdoor cooking apparatus which has all the advantages of the prior art and none of the disadvantages.

To attain this, the present invention essentially comprises a first angular framed member that has a plurality of support legs. At least two of the plurality of support legs form a pair of front legs. The pair of front legs are spaced one from the other and within a common plane. A third support leg of the plurality of support legs forms a rear leg. The rear leg is spaced an equal distance from the pair of front legs. The pair of front legs have a plurality of rungs fixedly attached. The plurality of rungs extend horizontally between the pair of front legs. Each of the plurality of rungs have a length varying from the length of any of the other rungs.

Provided is a second angular framed member. The second angular framed member has a plurality of support legs. At least two of the plurality of support legs form a pair of front legs. The front legs of the second angular framed member are space one from the other and within a common plane. The second angular framed member is spaced from the first angular member, on an orientation, for allowing the front legs of the first angular member to face the front legs of the second angular member. A third support leg is a rear leg that is spaced an equal distance from the pair of front legs. The pair of front legs have a plurality of rungs fixedly attached and extended horizontally between the pair of front legs. Each of the plurality of rungs has a length varying from the length of any one of the other rungs. Lastly, a pair of support poles are included. Each support pole is positioned between the first angular frame member and the second angular frame member, when the front legs of the first angular member face the front legs of the second angular member. Each of the support poles has a pair of free ends. One of the free ends of each of the pair of support poles rest on one of the rungs of the first angular member, while another of the free ends of each of the pair of support poles rest on a complementary rung of the second angular member. The pair of support poles support a cooking utensil when supported on the rungs of the first and second angular members.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved outdoor cooking apparatus which has all the advantages of the prior art outdoor grills and none of the disadvantages.

It is another object of the present invention to provide a new and improved outdoor cooking apparatus which may be easily and efficiently manufactured and marketed.

It is a further object of the present invention to provide a new and improved outdoor cooking apparatus which is of a durable and reliable construction.

An even further object of the present invention is to provide a new and improved outdoor cooking apparatus which is susceptible of a low cost of manufacture with regard to both materials and labor, and which accordingly is then susceptible of low prices of sale to the consuming public, thereby making such outdoor cooking apparatus economically available to the buying public.

Still yet another object of the present invention is to provide a new and improved outdoor cooking apparatus which provides in the apparatuses and methods of the prior art some of the advantages thereof, while simultaneously overcoming some of the disadvantages normally associated therewith.

Still another object of the present invention is to providing a portable rack system for cooking over campfires.

Lastly, it is an object of the present invention to provide a new and improved first angular framed member. The first angular framed member has a pair of front legs and a rear leg. The pair of front legs of the first angular framed member have a plurality of rungs fixedly attached and horizontally extending between the pair of front legs. Included is a second angular framed member that has a pair of front legs and rear leg. The rear leg is spaced an equal distance from the pair of front legs. The pair of front legs of the second angular framed member have a plurality of rungs fixedly attached thereto and horizontally extending between the pair of front legs. Finally, a pair of support poles are provided. Each support pole is positioned between the first angular frame and the second angular frame when the front legs of the first angular member face the front legs of the second angular member.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

Similar reference characters refer to similar parts throughout the several views of the drawings.

DESCRIPTION OF THE PREFERRED EMBODIMENT

Figure 1:
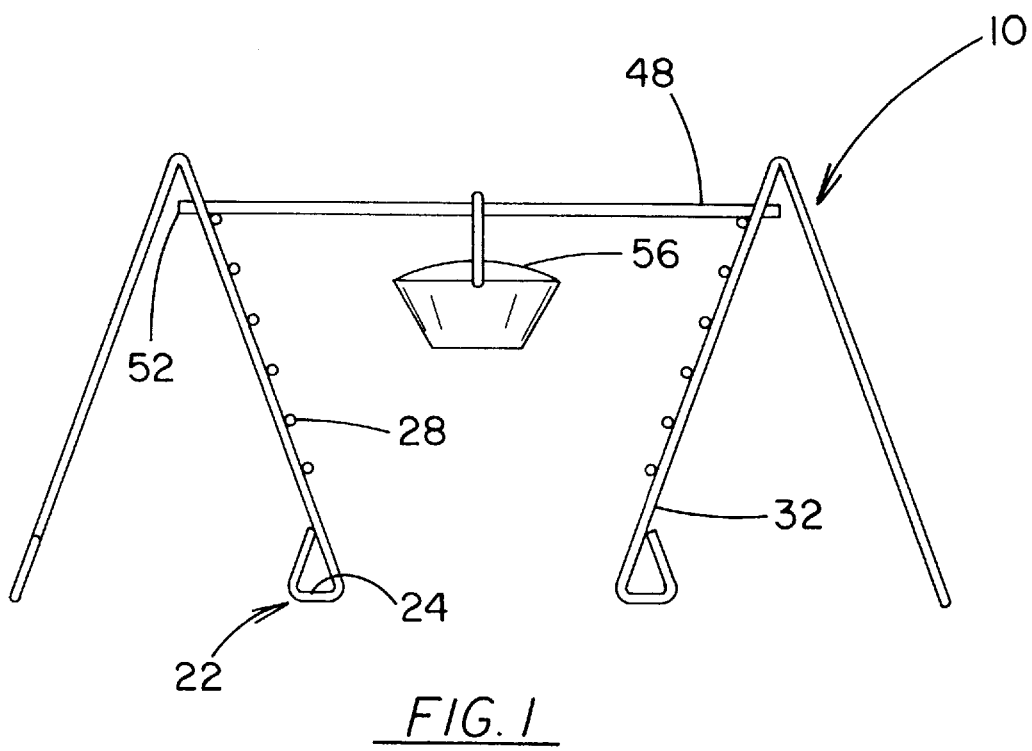
FIG. 1 is a perspective illustration of the preferred embodiment of the outdoor cooking apparatus constructed in accordance with the principles of the present invention.

With reference now to the drawings, and in particular to FIG. 1 thereof, a new and improved outdoor cooking apparatus embodying the principles and concepts of the present invention and generally designated by the reference numeral 10 will be described.

The present invention, the new and improved outdoor cooking apparatus, is comprised of a plurality of components. Such components in their broadest context include a pair of framed angular members and a pair of support poles. Such components are individually configured and correlated with respect to each other so as to attain the desired objective.

Figure 2:
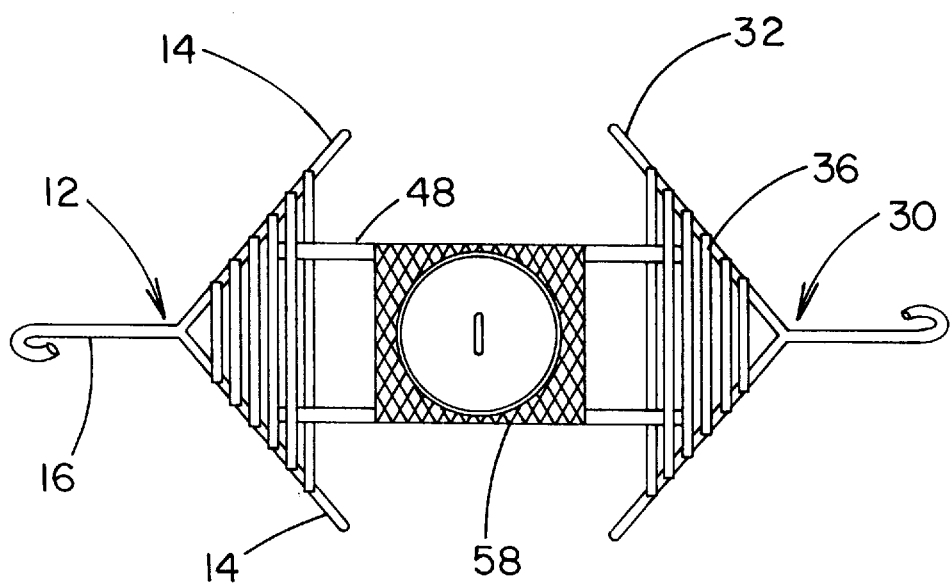
FIG. 2 is a top view of the present invention cooking apparatus of FIG. 1.

More specifically, the present invention includes a first angular framed member 12 that has a plurality of support legs. At least two of the plurality of support legs form a pair of front legs 14. The pair of front legs are spaced one from the other and within a common plane. A third support leg of the plurality of support legs forms a rear leg 16. The rear leg is spaced an equal distance from the pair of front legs, as shown in FIGS. 1 and 2.

Figure 3:
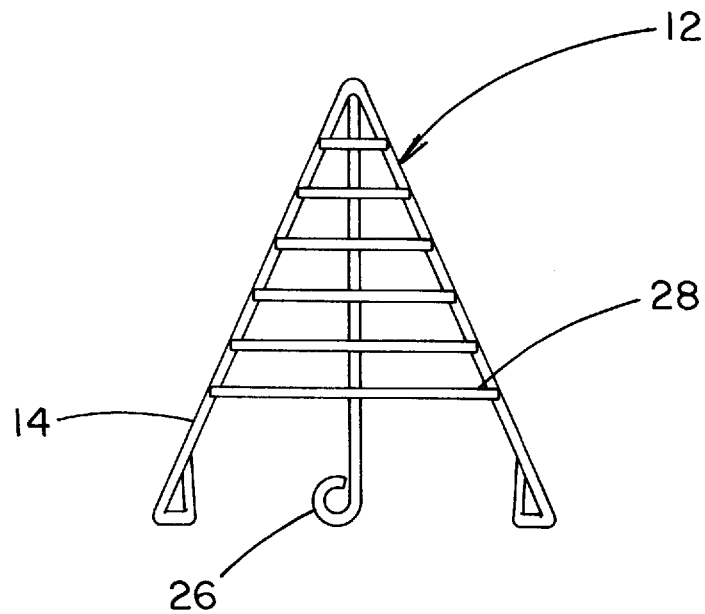
FIG. 3 is a frontal view of the present invention.

As best illustrated in FIG. 3, each of the pair of front legs have a generally triangular stabilizer 22. The triangular stabilizer has a base portion 24 that makes flush contact with the ground. The rear leg has a generally circular stabilizer 26. The pair of front legs have a plurality of rungs 28 fixedly attached. The plurality of rungs extend horizontally between the pair of front legs. Each of the plurality of rungs, as seen in FIG. 2, have a length varying from the length of any of the other rungs.

Provided is a second angular framed member 30. The second angular framed member has a plurality of support legs. At least two of the plurality of support legs form a pair of front legs 32. The front legs of the second angular framed member are space one from the other and within a common plane. The second angular framed member is spaced from the first angular member, on an orientation, for allowing the front legs of the first angular member to face the front legs of the second angular member. A third support leg is a rear leg 34, which is clearly set out in FIG. 4. The rear leg of the second angular framed member is spaced an equal distance from the pair of front legs.

Figure 4:
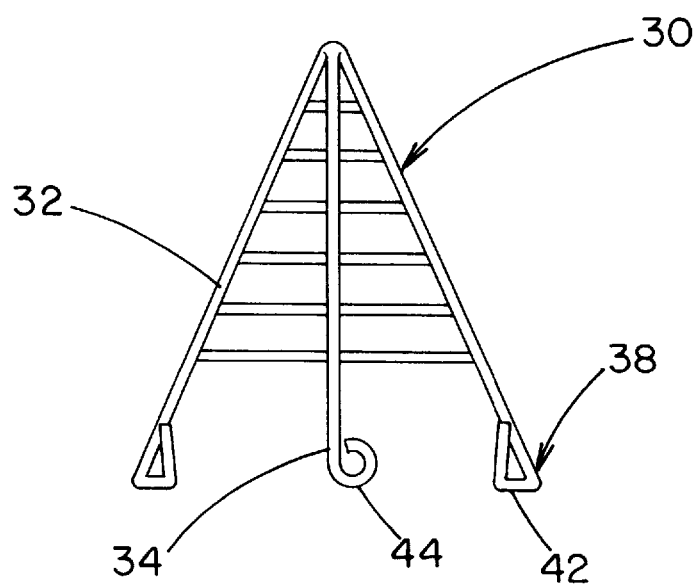
FIG. 4 is a rear view of the present invention.

The pair of front legs have a plurality of rungs 36 fixedly attached and extended horizontally between the pair of front legs. Each of the plurality of rungs has a length varying from the length of any one of the other rungs, just as the rungs shown in FIG. 3. As best illustrated in FIG. 4, each of the pair of front legs of the second angular framed member have a generally triangular stabilizer 38. The triangular stabilizer has a base 42 portion that makes flush contact with the ground. The rear leg of the second angular framed member has a generally circular stabilizer 44.

Lastly, a pair of support poles 48 are included. Each of the support poles have an identical length and width. Each support pole is positioned between the first angular frame member and the second angular frame member, when the front legs of the first angular member face the front legs of the second angular member. Each of the support poles has a pair of free ends 52, as shown in FIG. 1. One of the free ends of each of the pair of support poles rest on one of the rungs 28 of the first angular member, while another of the free ends of each of the pair of support poles rest on a complementary rung 36 of the second angular member.

The pair of support poles support a cooking utensil when supported on the rungs of the first and second angular members. In FIG. 1 the cooking utensil is a pot 56 that is supported by it's handle. In FIG. 2 the poses have a grate 58 straddled between the poles. The grate will support a pot or a food to be cooked.

The present invention is a outdoor cooking apparatus that consist of a pair of angular framed members and a pair of support poles made of a light weight steel. Each of the angular framed members are made in a tripod style with front legs providing a stepladder like portion.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved outdoor cooking apparatus for cooking over campfires comprising in combination:

a first angular framed member having a plurality of support legs, at least two of the plurality of support legs forming a pair of front legs being spaced one from the other and within a common plane, a third support leg forming a rear leg and being spaced an equal distance from the pair of front legs, the pair of front legs having a plurality of rungs fixedly attached thereto and horizontally extending between the pair of front legs, each of the plurality of rungs having a length varying from the length of any of the other rungs;

a second angular framed member having a plurality of support legs, at least two of the plurality of support legs forming a pair of front legs being space one from the other and within a common plane, the second angular framed member being spaced from the first angular member on an orientation for allowing the front legs of the first angular member to face the front legs of the second angular member, a third support leg being a rear leg that is spaced an equal distance from the pair of front legs, the pair of front legs having a plurality of rungs fixedly attached thereto and horizontally extending between the pair of front legs, each of the plurality of rungs having a length varying from the length of any one of the other rungs; and a pair of support poles with each support pole being positioned between the first angular frame and the second angular frame when the front legs of the first angular member face the front legs of the second angular member, each of the support poles have a pair of free ends, one of the free ends of each of the pair of support poles rest on one of the rungs of the first angular member while another of the free ends of each of the pair of support poles rest on a complementary rung of the second angular member, the pair of support poles supporting a cooking utensil when supported on the rungs of the first and second angular members.

2. A new and improved outdoor cooking apparatus for cooking over campfires comprising in combination:

a first angular framed member having a pair of front legs and a rear leg, the pair of front legs of the first angular framed member having a plurality of rungs fixedly attached thereto and horizontally extending between the pair of front legs;

a second angular framed member having a pair of front legs and rear leg, the rear leg being spaced an equal distance from the pair of front legs, the pair of front legs of the second angular framed member having a plurality of rungs fixedly attached thereto and horizontally extending between the pair of front legs, and a pair of support poles with each support pole being positioned between the first angular frame and the second angular frame when the front legs of the first angular member face the front legs of the second angular member.

3. The outdoor cooking apparatus as set forth in claim 2, wherein the pair of front legs of the first angular framed member being space one from the other and within a common plane, the rear leg and being spaced an equal distance from the pair of front legs, and each of the plurality of rungs having a length varying from the length of any of the other rungs.

4. The outdoor cooking apparatus as set forth in claim 2, wherein the pair of front legs of the second angular framed member being within a common plane, the second angular framed member being spaced from the front angular member on an orientation for allowing the front legs of first angular member to face the front legs of the second angular member, and each of the plurality of rungs having a length varying from the length of any of the other rungs.

5. The outdoor cooking apparatus as set forth in claim 2, wherein each of the support poles have a pair of free ends, one of the free ends rest on one of the rungs of the first angular member while another of the free ends rest on a complementary rung of the second angular member, and the pair of support poles supporting a cooking utensil when supported on the rungs of the first and second angular members.

* * * * *